United States Patent [19]
Okouchi

[11] Patent Number: 5,623,559
[45] Date of Patent: Apr. 22, 1997

[54] COMMUNICATION TERMINAL TRANSMITTING FIRST AND SECOND COORDINATE DATA IN FIRST AND SECOND MODES

[75] Inventor: Fusakichi Okouchi, Atsugi, Japan

[73] Assignee: Ricoh Company, Ltd., Tokyo, Japan

[21] Appl. No.: 6,520

[22] Filed: Jan. 21, 1993

[30] Foreign Application Priority Data

Jan. 24, 1992 [JP] Japan ..................................... 4-010531

[51] Int. Cl.$^6$ .......................... H04N 1/387; H04M 11/00; G09G 5/00
[52] U.S. Cl. .......................... 382/293; 382/298; 358/452; 345/2; 379/96
[58] Field of Search .......................... 178/18, 19; 379/96; 345/104, 179, 2, 3, 130, 127, 132; 358/452, 453; 382/293, 298

[56] References Cited

U.S. PATENT DOCUMENTS

| | | | |
|---|---|---|---|
| 4,414,621 | 11/1983 | Bown et al. | 379/96 |
| 4,424,572 | 1/1984 | Lorig | 364/900 |
| 4,736,407 | 4/1988 | Dumas | 379/96 |
| 4,965,678 | 10/1990 | Yamada | 358/452 |
| 5,072,412 | 12/1991 | Henderson, Jr. et al. | 385/159 |
| 5,177,328 | 1/1993 | Ito | 178/18 |
| 5,239,373 | 8/1993 | Tang | 178/18 |
| 5,243,149 | 9/1993 | Comerford | 178/18 |

OTHER PUBLICATIONS

Microsoft Mail for Windows Version 3.06, 1992 Help Documentation.
Jacob Nielsen, "Hypertext & Hypermedia", 1990 pp. 127–141, 14–27.
The Norton PC Anywhere User's Guide, 1991.

Primary Examiner—Edward L. Coles, Sr.
Assistant Examiner—Kimberly A. Williams
Attorney, Agent, or Firm—Oblon, Spivak, McClelland, Maier & Neustadt, P.C.

[57] ABSTRACT

A writing pad is used for displaying information, in which the displayed information can be controlled in accordance with a corresponding control information controlling contents of the displayed information. A communicating unit is used for communicating the displayed information and the control information to another communication terminal apparatus. A mode selecting unit is used for selecting one of a plurality of modes, wherein the displayed information corresponding to an image displayed through the writing pad and the control information are communicated to the other communication terminal apparatus in a first mode of the plurality of modes, and wherein document information corresponding to a document is communicated to the other communication terminal apparatus in a second mode of the plurality of modes.

6 Claims, 5 Drawing Sheets

COMMUNICATION TERMINAL TRANSMITTING FIRST AND SECOND COORDINATE DATA IN FIRST AND SECOND MODES

BACKGROUND OF THE INVENTION

1. Field of the Invention

The present invention relates to a communication terminal apparatus to be used for a remote meeting (a meeting held between persons who are physically apart from each other, a certain communication system thus being needed to enable these persons to communicate with each other), which apparatus has such functions as communicating through so-called tele-writing and controlling documents.

2. Discussion of the Background

A tele-writing apparatus is defined in the CCITT (International Telegraph and Telephone Consultative Committee) Recommendation T.150, as being a remote communication terminal which communicates with another remote communication terminal via a communication line, which terminal has a display device and a hand writing inputting device, which terminal transfers hand writing input information, that is, information which has been input by hand writing, to the other terminal while a conversation is taking place, and which terminal helps the persons taking part in the conversation to understand the transferred hand writing input information by displaying it.

The Shimazu corporation has developed such a tele-writing apparatus named "pen-telephone" (type TW101, hand writing communication terminal equipment with a facsimile function), which apparatus displays, on respective liquid crystal displays of both the present apparatus and another apparatus, drawing information comprising characters and diagrams, the liquid crystal displays having transparent tablets respectively formed therein, and inputs information by hand writing on the transparent tablets so that the corresponding input image information is displayed on the liquid crystal displays of both the apparatuses in real time.

Further, in a system for a remote meeting utilizing such tele-writing apparatuses, it is necessary to communicate, that is, transmit and receive, and treat the following two types of data: a bulk type data and a real time type data. The bulk type data is typically utilized as a facsimile data based on raster images, and the real time type data is typically utilized as a tele-writing data based on position information.

Either only the tele-writing apparatus itself may be used, or the tele-writing apparatus may be used together with a display of a raster image, in a remote meeting. In the remote meeting, a common document is displayed on both apparatuses, the contents of the displayed document being then controlled (modified) through the real time type data. The document controlling (modifying) may include specifying the document, modifying it by hand writing, enlarging/reducing the size thereof, scrolling the contents, and rotating a direction thereof.

In the "pen-telephone", it is possible for the hand writing inputting to be performed only with respect to the presently displayed contents. Thus, in a case where a memorandum to be referred to in the present conversation includes a plurality of pages, it is necessary that the presently displayed contents is to be deleted after the contents are printed out once, and further, it is then necessary that the other hand written information be written.

This action interrupts the smooth proceeding of a remote meeting, and further the previous drawing information, which has been deleted after printing of the displayed contents, cannot be displayed again. Further, the "pen-telephone" does not have functions for storing a memorandum including a plurality of pages.

Further, the tele-writing apparatus according to the CCITT Recommendation T.150 only transmits/receives hand written information. It does not define other functions for transmitting/receiving a document and other functions for displaying/controlling contents of the document. Such a tele-writing apparatus cannot provide a smooth remote meeting.

Further, according to the Recommendation T.150, it is normal for the tele-writing apparatus to be used alone. Thus, it is possible to use the apparatus for making a memorandum of a meeting. Further, in a case where the operation mode of the tele-writing apparatus is changed between a first simple tele-writing mode and a second mode in which a document is transmitted/received, it is necessary to store the presently displayed file of information, to finish the current operation according to the first mode, to start another operation according to the second mode, and then to load the file. Such troublesome operations may interfere with the smooth proceeding of the meeting.

SUMMARY OF THE INVENTION

An object of the present invention is to provide a communication terminal apparatus in which an operation mode thereof can be smoothly changed between the simple tele-writing mode and the tele-writing with document controlling mode.

To achieve the above object, the communication apparatus according to the present invention comprises:

writing pad means for displaying information, in which writing pad means the displayed information can be controlled in accordance with a corresponding information controlling specification;

communicating means for communicating the displayed information and the information controlling specification to another communication terminal apparatus: and mode selecting means for selecting one of a plurality of modes, wherein the displayed information corresponding to an image displayed through the writing pad means and the information controlling specification are communicated to the other communication terminal apparatus in a first mode of the plurality of modes, and wherein document information corresponding to a document is communicated to the other communication terminal apparatus in a second mode of the plurality of modes.

Other objects and further features of the present invention will become more apparent from the following detailed description when read in conjunction with the accompanying drawings.

DESCRIPTION OF THE PREFERRED EMBODIMENT

A communication terminal apparatus according to the embodiment of the present invention changes an operation mode thereof between the simple tele-writing mode and the tele-writing with document controlling mode. In the tele-writing with document controlling mode, the communication terminal apparatus transmits a logical coordinate data according to a logical coordinate system based on a range of document information, which range is the same as that displayed. Further, the communication terminal apparatus converts the transmitted logical coordinate data to another logical coordinate data based on a screen display size, the converted coordinate data then being displayed.

The communication terminal apparatus has a writing pad, which displays various kinds of image information such as character information, drawing information, and figure/graph information; and document information. Further, controlling of the contents of the displayed information such as the various kinds of image information and the document information can be controlled, that is, modified and/or scrolled, in accordance with a corresponding specification such as one specifying coordinate information and/or various kinds of control information displayed on the screen.

The communication terminal apparatus further has a communication control unit through which: the communication terminal apparatus and another communication terminal apparatus(es) (referred to hereafter as "the other communication terminal apparatus") are communicated with each other via a public communication line such as ISDN; and the various kinds of image information and the document information both displayed on the screen of the writing pad and the specification specified for each display are communicated to the other communication terminal apparatus(es) in real time.

The communication terminal apparatus further has a mode selecting means for selecting an operation mode of the communication terminal apparatus from a simple tele-writing mode and a tele-writing with document controlling mode. In the simple tele-writing mode, contents of the specification specified and the various kinds of image information displayed on the screen of the writing pad are communicated to the other communication terminal apparatus in real time, image information the same as the various kinds of image information that are displayed in the communication terminal apparatus then being displayed in the other communication terminal apparatus. In the tele-writing with document controlling mode, contents of the specification specified and the various kinds of image information displayed on the screen of the writing pad and the document information are communicated to the other communication terminal apparatus in real time, image information and document information the same as the various kinds of image information and document information that are displayed in the communication terminal apparatus then being displayed in the other communication terminal apparatus.

The communication terminal apparatus further has information attaching means. The information attaching means, when the various kinds of image information and/or the document information are transmitted in each mode selected by the mode selecting means, attaches, to a predetermined communication control signal, mode information corresponding to the selected mode, specification information corresponding to the specification specified for each display of the various kinds of image information and the document information.

Thus, when the various kinds of image information and/or the document information are transmitted while a remote meeting is proceeding, the mode information and the specification information are then transmitted with the predetermined communication control signal. Further, when the mode selecting means selects another operation mode while the remote meeting is proceeding, the present operation mode is changed to the selected mode immediately, the specification in the selected operation mode can be specified.

In the above-mentioned configuration, smooth changing of the operation mode between the simple tele-writing mode and the tele-writing with document control mode can be performed while the remote meeting is proceeding. Further, both the tele-writing information and the document information can be treated in real time. Thus, a smooth proceeding of the remote meeting can be realized.

Further, in the communication terminal apparatus, when the contents of the various kinds of image information to be displayed on the screen of the writing pad are displayed or modified in the simple tele-writing mode, a first logical coordinate system based on the display screen size may be used, a first logical coordinate data based on the first logical coordinate system then being communicated with the other communication terminal apparatus in real time. When the contents of the document information to be displayed on the screen of the writing pad are modified or scrolled in the tele-writing mode with document control mode, a second logical coordinate system based on a displayed range of the document information may be used, a second logical coordinate data based on the second logical coordinate system then being communicated to the other communication terminal apparatus in real time.

In this configuration, a transmission, to the other communication terminal apparatus, of contents of the specification being specified for the document information can be executed in the tele-writing with document control mode. This results in further facilitating the use of and the operation of the communication terminal apparatus.

Further, the communication terminal apparatus may have coordinate conversion means, wherein, when the document information being processed or being communicated is displayed on the screen of the writing pad in the tele-writing with document control mode, the coordinate conversion means converts the second logical coordinate data based on the displayed range of the document information to the first logical coordinate data based on the display screen size.

This results in remote controlling of the document information in the tele-writing with document control mode being facilitated, which in turn results in facilitating the use of and the operation of the communication terminal apparatus.

Figure 1:
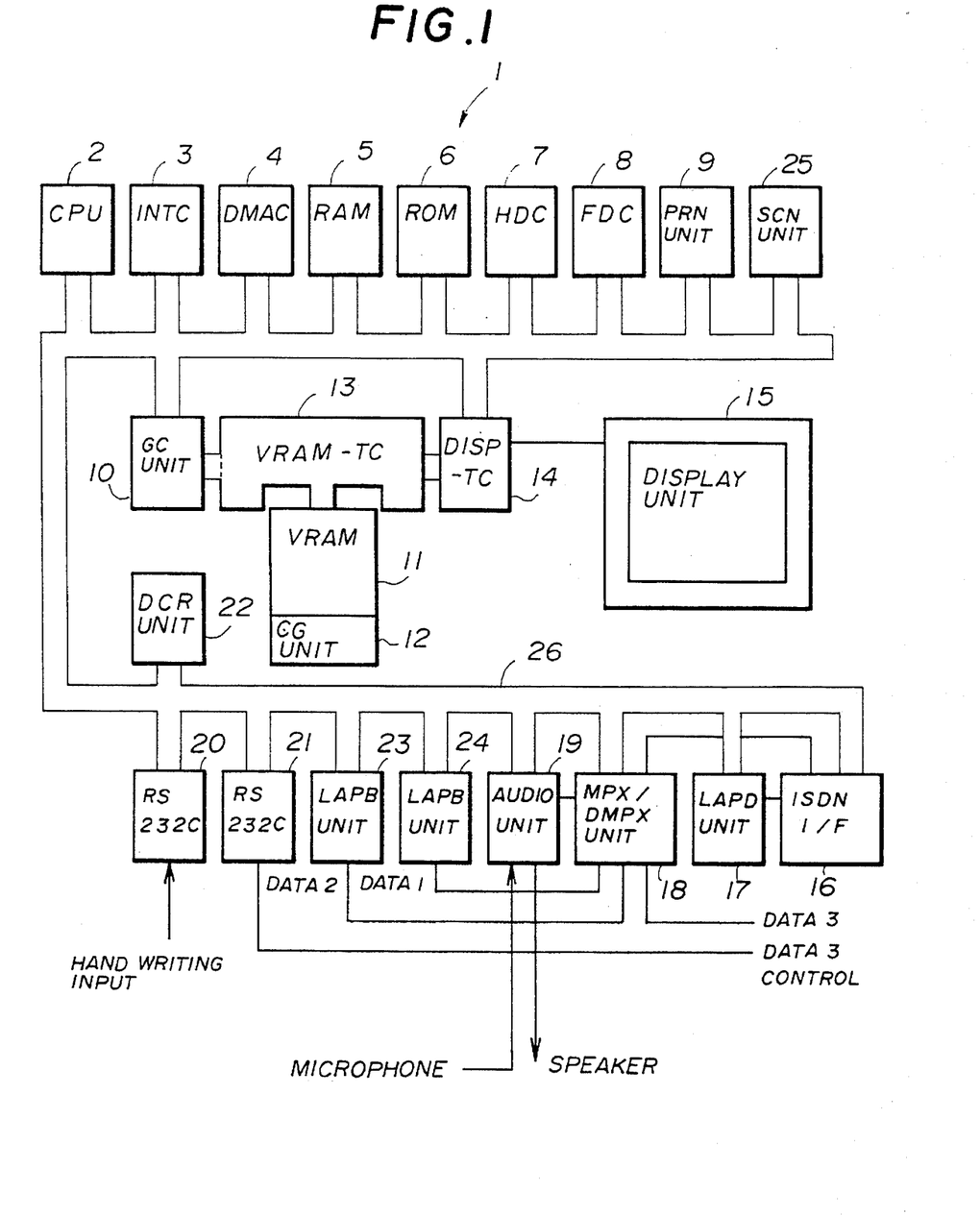
FIG. 1 shows a block diagram of a tele-writing apparatus acting as a communication terminal apparatus for a remote meeting according to an embodiment of the present invention.

As shown in FIG. 1, the tele-writing apparatus 1 according to the embodiment of the present invention has: a CPU (Central Processing Unit) 2, an INTC 3, a DMAC unit 4, a RAM (Random Access Memory) 5, a ROM (Read Only Memory) 6, a HDC 7, a FDC 8, a PRN unit 9, a GC unit 10, a VRAM (Video Random Access Memory) 11, a CG unit 12, a VRAM-TC 13, a DISP-TC 14, an ISDN I/F 16, a LAPD unit 17, an MPX/DMPX unit 18, AUDIO unit 19, RS232C units 20 and 21, a DCR unit 22, LAPB units 23 and 24, and an SCN unit 25. The respective units are connected with each other through a bus 26.

The CPU 2 executes sequences of the tele-writing apparatus 1 as a result of controlling the respective units according to programs stored in the ROM 6. Particularly, when the other tele-writing apparatus is communicated with, the CPU 2 controls changing of the operating mode between the tele-writing mode and the document mode as described below.

The INTC 3 executes interruption control processes for reporting matters occurring asymmetrically from the executed program.

The DMAC unit 4 executes a DMA (Direct Memory Access) control by which the CPU 2 can execute the program as a result of simple data transferring operations being executed by the DMAC unit 4 instead of the CPU 2, speedy performance of the processes of the entire system thus being realized.

The RAM 5 is used by the CPU 2 for storing data and programs.

The ROM 6 is used for storing programs and fixed data.

The HDC 7 controls a hard disc (not shown in FIG. 1; hereinafter referred to as an HD), and then controls storing of below described tele-writing image information.

The FDC 8 executes control of a floppy disc (not shown in FIG. 1; hereinafter referred to as an FD).

The PRN 9 is an interface for controlling a printer (not shown in FIG. 1).

The GC unit 10 executes graphic controlling with respect to the VRAM at a high speed, and provides timings for displaying. The GC unit 10 has functions for processing document information to be stored in the VRAM 11, the document information being processed on the screen of the writing pad in the tele-writing with document control mode.

The VRAM 11 stores the various kinds of image information, such as character information, drawing information and figure/graph information, and the document information, respectively utilized for the remote meeting. The VRAM 11 is accessed by the CPU 2 and the GC unit 10. The VRAM 11 has serial input output ports, thus enabling video data output to be quickly displayed.

The CG unit 12 is accessed by the GC unit 10, and stores data for displaying characters through a display unit 15.

The VRAM-TC 13 controls accessing to and refreshing of the VRAM 11 among the CPU 2, the GC unit 11, and the DISP-TC 14.

The DISP-TC 14 generates a display timing signal. The DISP-TC 14 generates signals necessary for the display unit 15 corresponding to a serial output from the VRAM 11 according to a display timing signal generated by the GC unit 10, the resulting display data then being transferred to the display unit 15.

Figure 2:
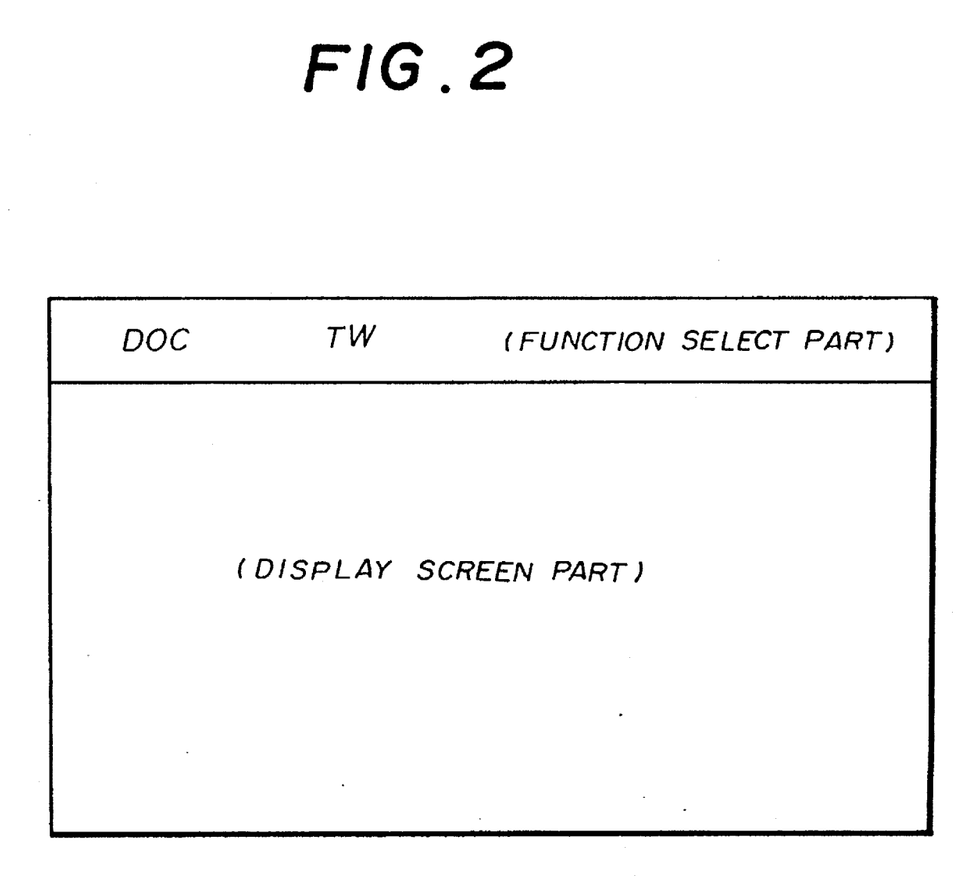
FIG. 2 shows a configuration of the contents displayed on a screen through a display device of the tele-writing apparatus shown in FIG. 1.

The display unit may comprise a CRT or a LCD. The display unit may have various control and display data depending on the type of the display unit. Thus, the type of the DISP-TC14 depends on the type of the display unit 15. Further, the display unit 15 is formed integrally with the writing pad (not shown in FIG. 1). Further, the screen of the display unit 15 includes a function selecting part (the mode selecting means) and a display screen part as shown in FIG. 2. The function selecting part is used for selecting the operating mode from the document (hereinafter, it will be referred to as DOC) mode (acting as the tele-writing with document control mode) and the tele-writing (hereinafter, it will be referred to as TW) mode (acting as the simple tele-writing mode). The display screen part is used for displaying a plurality of images, each of the images being made of the various kinds of image information such as character information, drawing information and figure/graph information and the document information, respectively utilized for the remote meeting.

The ISDN I/F 16 provides interfaces for physically connecting the tele-writing apparatus 1 with ISDN network (not shown in FIG. 1).

The LAPD (Link Access Production the Dchannel) unit 17 has an LSI (Large Scale Integrated Circuit) that processes the Dch layer 2 according to the ISDN.

The MPX/DMPX unit 18 multiplexes signals onto a basic interface (BPI) according to the ISDN signals used in this tele-writing apparatus, such as an audio signal, data (from both of the LAPB units), and data 3 (for example, moving picture data) and separates these signals from the basic interface (BPI).

The AUDIO unit 19 has a voice processing device for converting a voice from analog to digital and from digital to analog.

The RS232C units 20, 21 communicate serial data to the outside, two sets of these units having been provided in this embodiment, hand writing input data for tele-writing obtained from the writing pad being input through the RS232C unit 20, and a signal, that acts as a pair with the data 3, for controlling external units provided through the RS232C unit 21.

The DCR unit 22 performs compression (encoding) of, below described tele-writing information as raster data, and document information in accordance with an MMR system, that is an encoding system, and expansion (decoding) of the encoded raster data.

The LAPB (Link Access Protocol-Balanced) units 23 and 24 include an LSI that processes the Bch layer according to the ISDN, the LAPB units executing communicating processes for communicating the tele-writing information and the document information to the other tele-writing apparatus. When the tele-writing information and/or the document information is transmitted, the LAPB units 23 and 24 then transmit it, after attaching, to the predetermined communication control signal, each mode information and specification information indicating a specification specified for each image displayed on the writing pad. The LAPB units 23 and 24 act as the communication control means and the information attaching means.

The SCN unit 25 is an interface for controlling a scanner (not shown in FIG. 1).

Further, functions of the tele-writing apparatus 1 according to the embodiment of the present invention will now be described.

The present embodiment has features whereby the tele-writing apparatus 1, acting as the communication terminal apparatus for a remote meeting, can process both the various kinds of image information and the document information in real time, wherein, the same as in the other tele-writing apparatus, the operation mode is changed between the simple tele-writing mode and the tele-writing with document control mode.

Processes for reading a draft and transmitting the corresponding information will now be described.

After "draft reading" is selected through the writing pad, a corresponding command is then transferred to the scanner through the SCN unit 25, the read image data then being transferred to the tele-writing apparatus 1. The obtained image data is then compressed by the DCR unit 22, transmitted by a process of the G4 facsimile through one of the LAPB units 23 and 24 via the ISDN I/F 16 to the ISDN, then transmitted to the other tele-writing apparatus or a facsimile apparatus located in the other tele-writing apparatus.

In a case where the signal is received through the ISDN, the LAPD unit 17 starts the G4 facsimile method as mentioned above, the signal then being received in the tele-writing apparatus 1. The received image data is then stored in the HD through the HDC 7.

When the remote meeting is started, after the information "meeting start" is input through the writing pad, the CPU 2 executes an application program corresponding to the meeting, the channels for voice and for data then being connected to both the tele-writing apparatuses. The data obtained though the channel is multiplexed through the MPX/DMPX unit 28, and the multiplexed data transmitted from the other tele-writing apparatus is separated through the MPX/DMPX unit 28.

The multiplexed data may be voice, the above-mentioned bulk data, real time data, and data 3 for external extension. The data 3 may be, for example, moving picture data. The MPX/DMPX unit multiplexes/separates these four kinds of data.

Therefore, the following two or three kinds of data are transmitted/received after having been multiplexed: voice, data, and moving picture if the corresponding external unit has been employed.

Figure 3:
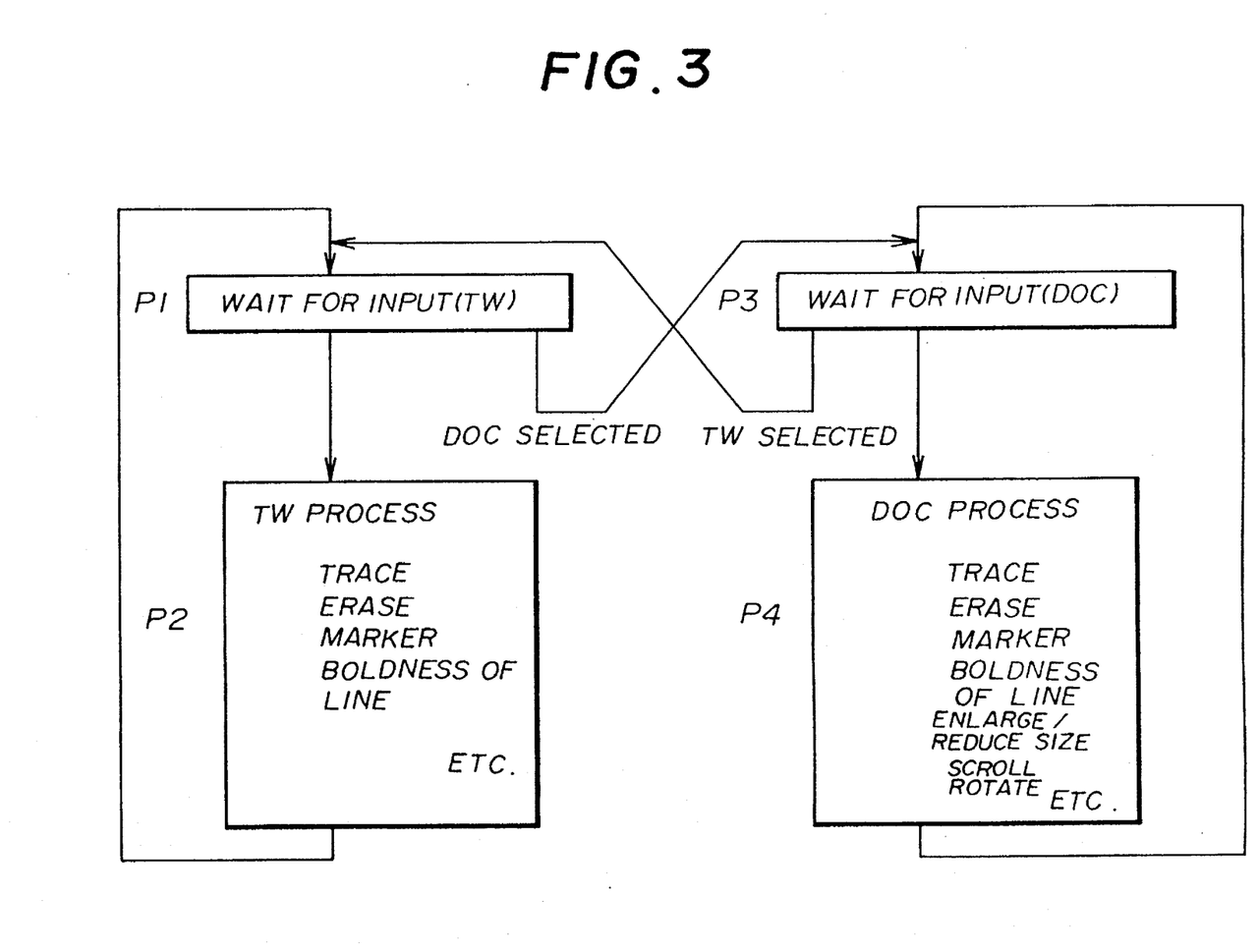
FIG. 3 shows a changing operation for changing an operation mode in the tele-writing apparatus shown in FIG. 1.

The main functions used for the meeting are, as shown in FIG. 3, document processing (DOC) and tele-writing (TW). When the DOC is selected, a particular file is specified, the file is read from the HD, and the contents of the file are then displayed through the display unit 15. Then, the displayed contents are transmitted to the other tele-writing apparatus, and an image the same as that being displayed through the display unit 15 of the tele-writing apparatus is displayed in the other tele-writing apparatus. When the TW is selected, then an image including nothing to be displayed is displayed on the display unit 15 of the tele-writing apparatus 1. The corresponding information is then transmitted to the other tele-writing apparatus, and an image the same as that in the tele-writing apparatus 1 is displayed in the other tele-writing apparatus. In this status, the meeting proceeds using voice and TW.

In the case where an explanation is given to the person using the other tele-writing apparatus by using the document, the "DOC" mode is selected through the function selecting part shown in FIG. 2. The document is displayed after having been selected as mentioned above. Then, the meeting proceeds, wherein the tele-writing function in the DOC mode is used based on the displayed document.

Main functions employed in the TW mode and the DOC mode will be described now with reference to FIG. 3. In FIG. 3, "trace" means displaying the hand writing information as a line, "erase" means deleting the display, and "marker" means indicating a particular position. Functions particular to the document display are "enlarge/reduce in size", "scroll" and "rotate".

Figure 4:
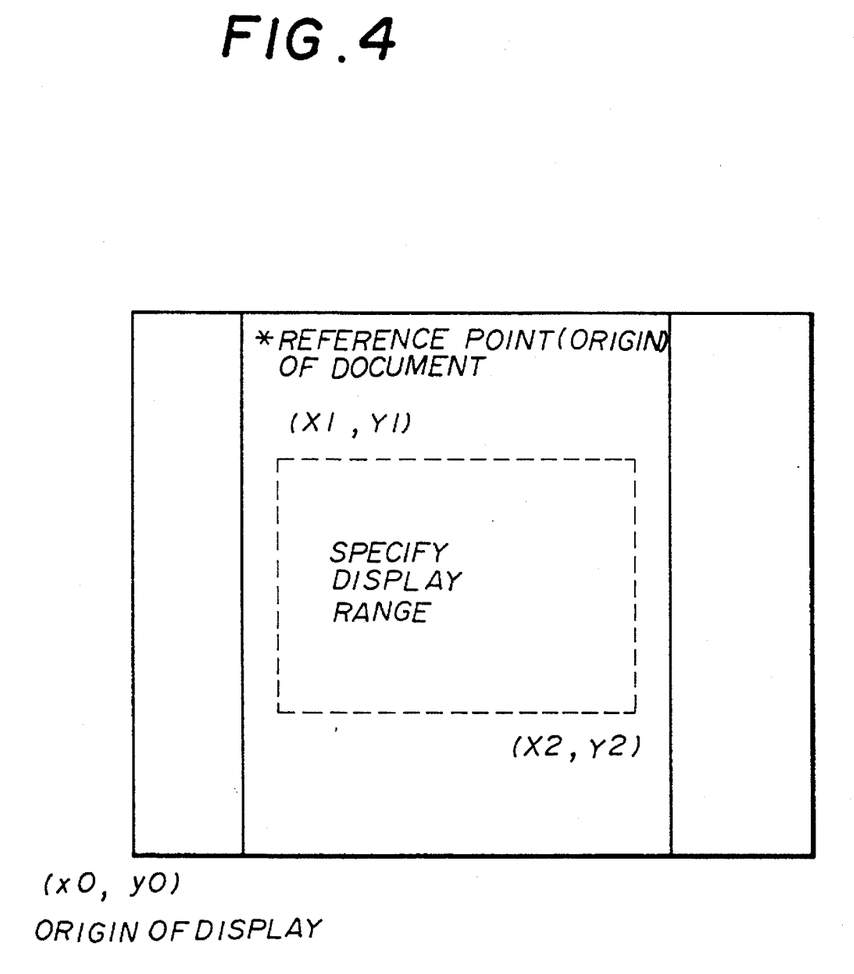
FIG. 4 shows a configuration of the contents of document information displayed on the screen through the display device of the tele-writing apparatus shown in FIG. 1.
Figure 5:
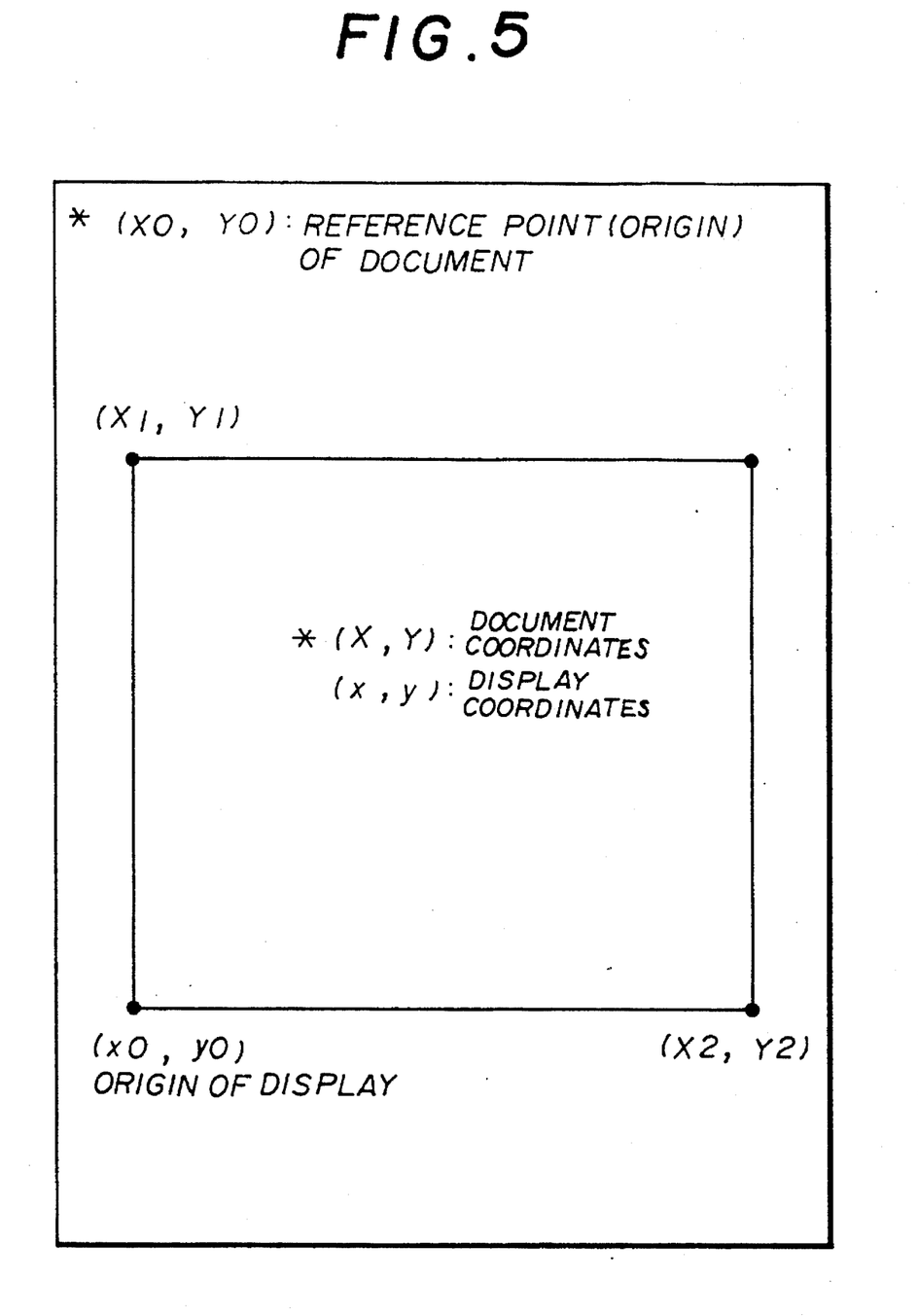
FIG. 5 shows reference coordinates for the document information, a specified range of the document information being displayed on the display device of the tele-writing apparatus shown in FIG. 1.

In an example of "reduce in size", an entire page of the document is displayed as a result of reducing the size of the page as shown in FIG. 4. In an example of "enlarge in size", the display range is specified by two points (X1, Y1) and (X2, Y2) opposite to each other, as shown in FIG. 5. Information corresponding to these actions is then transmitted to the other tele-writing apparatus, the same image thus being displayed there apparatus.

Operations by which the operation mode is changed between the simple tele-writing mode and the tele-writing with document control mode will now be described with reference to FIG. 3. A step P1 or P3 waits for inputting from the writing pad. When the inputting occurs in the step P1 in the TW mode, whether or not the "DOC function" is selected is determined. When it is not selected, the processes of the TW mode are executed (step P2), then the operation returns to the step P1. The processes of the TW mode are executed, wherein the alteration between the steps P1 and P2 is repeated. These processes are transmitted to the other tele-writing apparatus, the same image thus being always displayed there. When the "DOC function" is selected (step P3), the currently used document is then displayed (step P4), the step P3 then being executed again. In the step P3, when information is input from the writing pad, whether or not the "TW function" is selected is determined (P3). When it is not selected, the processes of the DOC function are then executed (step P4). When the "TW function" is selected, the above-mentioned TW image is again displayed and the tele-writing processes are then executed (steps P1 and P2).

As described above, the meeting proceeds, wherein the operation mode is changed between the TW and DOC modes, during the meeting.

Processes for synchronizing displays in the meeting will now be described.

The tele-writing functions are described in the CCITT Recommendation T.150 as mentioned above, wherein the following three kinds of resolutions of the image are defined: 512, 1024, and 2048 pixels/line. The corresponding coordinates are encoded, and the resulting information is transmitted to the other tele-writing apparatus together with the functions being transmitted.

It is necessary that the tele-writing apparatus 1 have a function of drawing the image as a result of converting the logical coordinates to the corresponding physical address in the display memory. Thus, after transmitting the logical coordinates (x, y), the corresponding image displaying depends on the local processes in both the tele-writing apparatus.

However, as the CCITT Recommendation T.150 does not define the processes for the document, a problem may occur when the document is to be displayed in the tele-writing apparatus 1. Generally speaking, the number of pixels of the raster image that has been read through the scanner is considerably larger than in the display unit. Thus, in the DOC mode processes shown in FIG. 3, it is necessary to add the enlarge/reduce size, scroll, and rotate direction functions, the display range then being enlarged, whereas, it is not necessary to add these functions in the TW mode.

Concretely speaking, the following two kinds of coordinates are needed to display the document data: coordinates indicating the range of the document data that is currently displayed, and position coordinates in the currently processed document. The relationship between both the kinds of coordinates will now be described with reference to FIG. 4. An origin of the document is called a reference point (origin) in the CCITT Recommendation, wherein it is defined that the reference point is located on the top-left side of the page, and the BMU (Basic Measurement Unit) is used as the coordinate unit. As shown in FIG. 4, the display range (the coordinates (X1, Y1) and (X2, Y2)) is specified based on the document coordinates, the processed position (the coordinates (X, Y)) then being transmitted. Thus, as shown in FIG.

5, the thus specified display range (defined by the coordinates (X1, Y1) and (X2, Y2) of the document page is displayed so that the bottom-left corner of the above display range corresponds to the original (x0, y0) of display, that is, the above display range of the document is displayed at the full range of the screen of the transmitter-side monitor.

These document coordinates (X, Y) are then converted to the logical coordinates (x, y) based on the display coordinates of the displayed image, the resulting logical coordinates then being converted to the corresponding physical address in the memory, that is, the VRAM 11 in the embodiment. As described above, in the DOC mode, the display coordinates (GU (Grid Unit) values) are not transmitted/received. Instead, the document coordinates are transmitted/received, wherein the employed coordinate unit is the BMU. Based on the display position in the page, which display position has been specified in the enlargement function, the corresponding logical coordinates of the image are obtained as a result of the document coordinates being converted, the obtained logical coordinates being then converted to the physical address in the memory. A description of processes executed in the tele-writing apparatus 1 after the coordinates corresponding to the BMU value having been transmitted/received will be omitted because these processes are performed locally in the tele-writing apparatus 1.

As described above, the tele-writing apparatus 1 has both the simple tele-writing function and the tele-writing with document control, wherein whether or not the function other than the current function is selected is determined based on the mode selecting information to be input from the writing pad. In the case where the other mode is selected, the operation mode is then changed to this other function mode. In the case where it is not selected, the current function is then executed. Thus, it is possible to realize the tele-writing apparatus 1 acting as the communication terminal apparatus to be used for the remote meeting, which apparatus has both the tele-writing function and the document controlling function.

Further, the coordinates employing the BMU unit are used as the logical coordinates of the document, the coordinates being transmitted/received. The coordinates are then converted to the logical coordinates of the display image, and the corresponding image is then displayed as a result of the local processes. Thus, remote control of the document information can be realized.

The tele-writing apparatus 1 having the above-mentioned configuration may be used for a remote meeting held between two or more tele-writing apparatuses. Then, during the meeting, the operation mode may be changed between the simple tele-writing mode and the tele-writing with document control mode as desired. Thus, the various kinds of desired image information such as character information, drawing information, and figure/graph information, and document information can be displayed as a corresponding image, the image being used to explain the information. Thus the meeting can be made to proceed smoothly.

Further, the present invention is not limited to the above described embodiments, and variations and modifications may be made without departing from the scope of the present invention.

What is claimed is:

1. A communication terminal apparatus comprising:

displaying means for displaying an image representing at least a portion of a document;

communicating means for communicating coordinate data concerning said image to another communication terminal apparatus; and mode selecting means for selecting one of a plurality of modes;

wherein, in a first tele-writing mode of said plurality of modes, said coordinate data is communicated to the other communication terminal apparatus through a logical coordinate system of displayed coordinates of the image displayed on the display means based on a size of said image so that a same size image as displayed on the display means is communicated to the other communication terminal;

wherein, in a second document mode of said plurality of modes, said coordinate data is communicated to said other communication terminal apparatus through a document coordinate system of document coordinates within the document based on a size of said document so that an image of a different size as displayed on the display means may be communicated to the other communication terminal, and wherein the communications are accomplished in real-time.

2. The communication terminal apparatus according to claim 1, wherein said coordinate data includes image information concerning said document and control information for controlling said image information.

3. The communication terminal apparatus according to claim 1, wherein, in said second mode, said coordinate data received by said other communication terminal apparatus in said document coordinate system is converted into said coordinate data in said logical coordinate system so that an image having a desired area of said document may be displayed through displaying means of said other communication terminal apparatus.

4. The communication terminal apparatus according to claim 1, further comprising information attaching means for attaching, to a predetermined communication control signal, mode information indicating which mode is selected by said mode selecting means, and information controlling a specification which is used to control image information concerning said document.

5. The communication terminal apparatus according to claim 1, further comprising mode communicating means for communicating mode information corresponding to the mode selected by said mode selecting means through said communicating means.

6. The communication terminal apparatus according to claim 1, wherein said communication terminal apparatus is used for a remote meeting.

* * * * *